United States Patent [19]

Jourjine

[11] Patent Number: 4,953,099
[45] Date of Patent: Aug. 28, 1990

[54] INFORMATION DISCRIMINATION CELL
[75] Inventor: Alexander N. Jourjine, Boston, Mass.
[73] Assignee: Massachusetts Institute of Technology, Cambridge, Mass.
[21] Appl. No.: 203,417
[22] Filed: Jun. 7, 1988
[51] Int. Cl.$^5$ .............................................. G06F 15/18
[52] U.S. Cl. .................................................. 364/513
[58] Field of Search ............... 364/513, 300, 200, 900; 382/15

[56] References Cited
PUBLICATIONS

N. H. Farhat et al., "Bimodal Stochastic Optical Learning Machine", DARPA Neural Network Study, Oct. 87–Feb. 88, Part II, pp. 365–372.

Linsker, Ralph, "Self-Organization in a Perceptual Network", *Computer*, Mar. 1988, pp. 105–117.

*Primary Examiner*—Allen MacDonald
*Attorney, Agent, or Firm*—Hamilton, Brook Smith & Reynolds

[57] ABSTRACT

Methods of information discrimination based on extremization of local, energy related functionals defined on macroscopic states of random code information processors are disclosed. In one embodiment, an assembly of processors exchanging information through the exchange of random codes serves an an information discriminator cell between the digitally encoded, analog, quasi-periodic input function and the digitally encoded, analog, quasi-periodic memory function stored within the cell.

8 Claims, 9 Drawing Sheets

INFORMATION DISCRIMINATION CELLS

INFORMATION DISCRIMINATION CELL

TECHNICAL FIELD

This invention relates to methods of pattern recognition for neural networks. The invention has particular application in feature extraction devices in the general area of pattern recognition for feature information discrimination.

BACKGROUND

Neural networks may be described as dynamical systems defined on networks of processors, where processors serve as vertices of the networks and processor pairs exchanging information serve as links. The dynamical state of a neutral network composed of processors P is generally described by quantities Fp, p=1, 2, . . , N, called activations which account for the level of activation of the processors and by quantities Dpq, p,q=1, 2, . . . N, called weights which account for the degree of the information exchange among pairs of processors. It is generally assumed that learning in neural networks can be described by adjustment of weights which is slow compared to adjustment of activations.

Applications of neural networks to pattern recognition require neural networks to discriminate input information with regard to presence or absence of certain features. One of the most important unsolved problems in pattern recognition both within neural network approach and other approaches such as Artificial Intelligence is automatic feature extraction.

Various methods are known in the prior art for neural network feature extraction and pattern recognition. One method, known as back propagation of error, involves minimization of error functional which is the sum over squared differences between the desired and actual outputs of the output processors. The disadvantages of this method include inability to prove convergence to global extremum and slowness of the convergence due to the fact that the error functional is global, i.e., for practical systems it is a very complicated expression where each term of the sum depends on most of the activations and weights of the neural network which, in its turn, makes it very difficult to build hardware implementations of the method. In addition this method requires the knowledge of the desired output. Another means to implement pattern recognition through neural networks known in the art as the adaptive resonance model involves judicious choice of rates of adjustment of weights so that the resultant neutral network would mimic behavior of the brain. The obvious disadvantage of this method is arbitrariness in the choice of the rates of adjustment due to general lack of understanding of the physiology of the brain; and lack of predictability of the behavior of the model and difficulty with hardware implementations since the method is presented as a set of abstract differential equations. Methods and devices for information processing using analog characteristics of inputs were described in prior patent application Ser. Nos. 026,479 filed 03/16/87, and 113,636 filed 10/27/87 and in application Ser. No. 203,463 filed 6-7-88.

DISCLOSURE OF THE INVENTION

Therefore, there exists a need for methods of feature extraction and information discrimination which are based on extremization of local functionals such that the functionals are represented in terms of parameters of physical processes such as energy contained in the inputs.

Information Discrimination Cell comprises input cells Pi, memory cells Pm, and one or more discrimination cells Pd. Each cell comprises a random code neural network (RCNN) processor whose state is described by a binary valued piece-wise constant function Dp(t) whose discontinuities occur at the time equal to integer multiples of the inverse of the base frequency fo, so that the activation Fp of P's processor of RCNN is given by $$F_p \equiv\, = <D_p(t)> = (1/T_c) \int_{t-T_c}^{t} dt' D_p(t')$$

and the weight Dpq for a pair of processors P, Q is $$D_{pq} = <D_p(t)D_q(t)>/(<D_p(t)><D_p(t)>).$$

Codes Dp(t) can have non-zero values only within windows of length Tp, called pulse length, within code length Tc, Tp<Tc. The activation timing tp(t) denotes the time between the beginning of the code length and the pulse length cycles. Within the pulse length windows, codes are represented by random binary numbers. As a consequence weights Dpq may be written down as $$D_{pq} = (T_c/T_p^2)(T_p - \text{abs}(t_p - t_q)) \quad t_p - t_q < T_p$$
$$D_{pq} = 0 \quad t_p - t_q > T_p$$

where abs(tp−tq) is the absolute value of tp−tq.

The operation of the Information Discrimination Cell is comprised of two cycles occurring simultaneously: the discrimination cycle and the memory cycle. During the discrimination cycle the discrimination cells Pd of the IDC receives information from the input cells Pi and the memory cells Pm. The activations Fd(t) of the discrimination cells are dependent on the match between their total input Li(t) from the input cells Pi and the total input Lm(t) from the memory cells. The match is determined by extremization of a disorder functionals Wd(t) computed by RCNN processors Pd of the discrimination cells through varying timings td(t) of processors Pd. During the memory cycle, memory cells Pm receive information from the discrimination cells Pd and, provided their input exceeds a threshold, adjust memory timings tm(t). Activations Fm(t) of the memory cells are dependent on the activations Fd(t) of the discrimination cells and on the match between the input and the memory cell codes Di(t) and Dm(t).

In one embodiment of the present invention with common channel of communication for memory, input and discrimination cells said disorder functional for a RCNN processor P is linear in the timing tp(t)

$$W_p = aC_p$$

where a is a coefficient of proportionality and Cp is the correlation functional $$C_p = <L_p(t)D_p(t)> - <L_p(t)><D_p(t)>$$

$$L_p(t) = SUM_q[T_{pq} D_q(t)],$$

where SUMq denotes the sum over q and Tpq are some numerical coefficients due to attenuation of signals $0 < Tpq < 1$.

In other embodiment of the present invention with separate channel of communication for each RCNN processor the disorder functional is quadratic in timing tp(t)

$$Wp = b\ SUMq[Tpq\ Cpq(t)Cpq(t)]$$

$$Cpq(t) = <Dp(t)Dq(t)> - <Dp(t)><Dq(t)>$$

where b is a coefficient of proportionality.

In yet another embodiment of the present invention with separate channel of communication for each RCNN processor and with disorder functional quadratic in timing tp(t)

$$Wp = b'SUMq[Tpq\ Fpq\ Cpq]$$

$$Fpq = <Dp(t)Dq(t)>$$

where b' is a coefficient of proportionality.

In yet another embodiment of the present invention with separate channel communication for each RCNN processor and with disorder functional quadratic in tp $$Wp = c\ SUMq[Tpq\ Xpq\ Cpq]$$

$$Xpq(t) = <(2Dp(t)-1)(2Dq(t)-1)>$$

where c is a coefficient of proportionality.

In yet other embodiment of the present invention the disorder functional Wp is a linear combination of the disorder functionals linear and quadratic in timing tp(t).

Various other features of the method of the present invention will become obvious to those skilled in the art upon reading the disclosure set forth hereinafter.

BRIEF DESCRIPTION OF THE DRAWINGS

The foregoing and other objects, features and advantages of the invention will be apparent from the following more particular description of the preferred embodiment of the invention, as illustrated in the accompanying drawings in which like reference characters refer to the same parts throughout different views. The drawings are not necessarily to the scale, emphasis instead is placed upon the principles of the invention.

DETAILED DESCRIPTION OF PREFERRED EMBODIMENT

Figure 1:
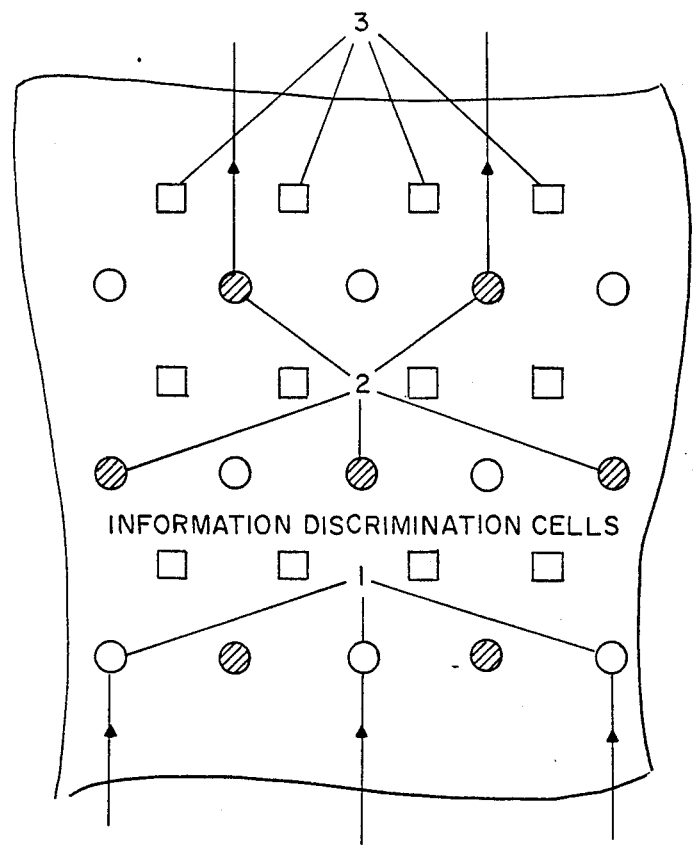
FIG. 1 is a block-diagram of an array of Information Discrimination Cells.

Referring now to FIG. 1 a block-diagram of an array of Information Discrimination Cells is shown. Said array is a regular arrangement of input cells 1 (white circles), memory cells 2 (black circles), and discrimination cells 3 boxes. Input cells 1 receive the external input which is to be discriminated. The input comprises a linear combination of random codes D(t), each a binary valued piece-wise constant function of time. The output of the input cells 1 comprises a random code Di(t). The to be discriminated information carried by the code comprises the average Fi(t) of the code function over a certain period of time T, which is a multiple of code length Tc $$Fi(t) = = <Di(t)> = (1/T) \int_{t-T}^{t} dt' Di(t').$$

Functions Fi(t) are called activations of the input cells Pi. Functions Fi(t) where "i" varies over input cells 1 of the Information Discrimination Cell (IDC) represent the external input into the IDC. Functions Fm(t), the activations of the memory cells Pm, represent the output of said IDC. The total number of input, memory, and discrimination cells in said IDC is dependent on the individual fanouts of said cells. The total number of memory cells is generally equal to the total number of the input cells.

In this particular embodiment of the present invention all communication between cells of an IDC proceed through a common communication channel and in cell inputs individual emissions add together linearly. In other embodiments with separate channel of communication for each cell individual contributions to the cell inputs are multiplied with each other or other dynamical quantities before being summed up to form an input.

In this particular embodiment of the present invention all communications are carried electronically. In other embodiments said communications are carried optically. In yet other communications said communications are carried acoustically.

Figure 2:
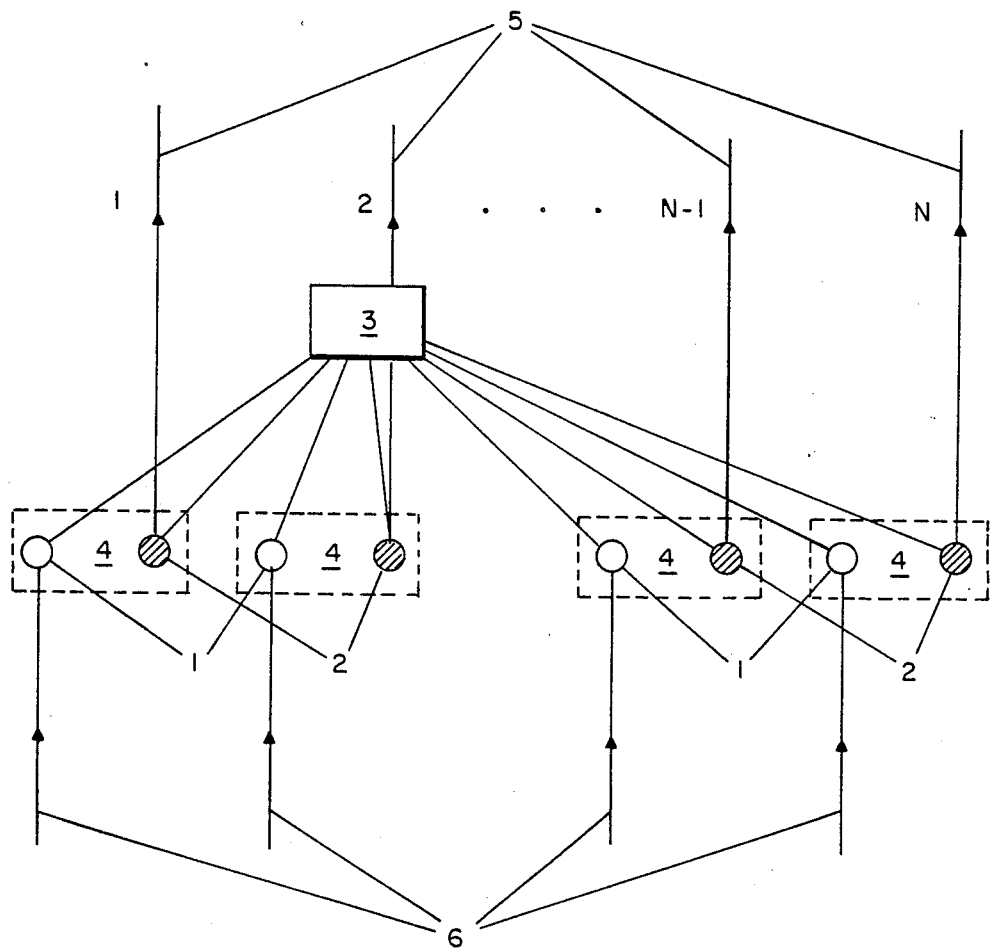
FIG. 2 is a block-diagram of an Information Discrimination Cell with one discrimination cell during discrimination cycle.

Referring now to FIG. 2 a block-diagram of an IDC with one discrimination cell is shown during its discrimination cycle with directed lines depicting the communication links between memory cells 2 and input cells 1, and discrimination cell 3. Input and memory cells are arranged in pairs 4 so that the attenuation coefficients Tpq are close in value for members of the pairs. Input cells 1 receive external input 6. Memory cells 2 emit output 5 for further use and processing. For each memory cell 2 of a pair 4 its activation Fm(t) depends on the activation Fd(t) of the discrimination cell 3 and on the matching of the codes Di(t) and Dp(t) of input cell 1 and memory cell 2 of said pair 4. Said matching is made dependent on $<Di(t)\ Dm(t)>$.

Figure 3:
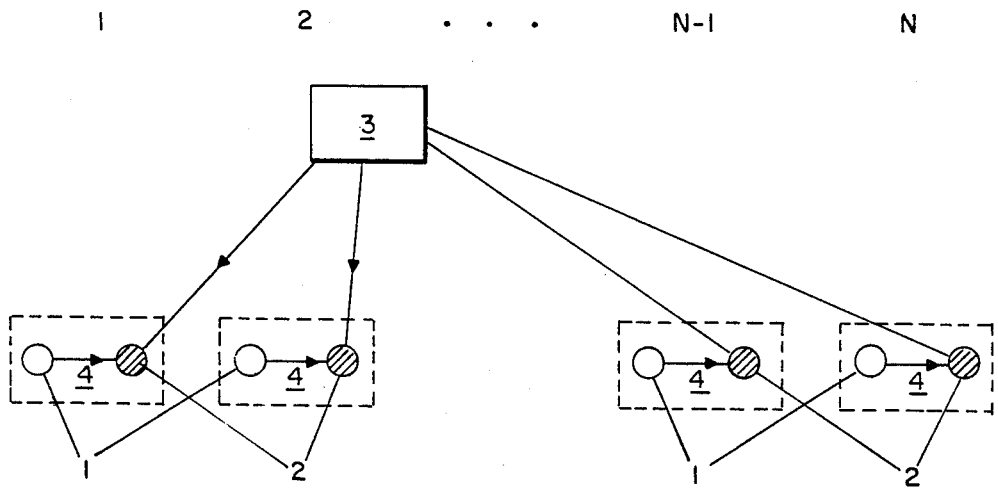
FIG. 3 is a block-diagram of an Information Discrimination Cell during memory cycle.

Referring now to FIG. 3 the IDC of FIG. 2 is shown during its memory cycle, which occurs simultaneously with the discrimination cycle. Discrimination cell 3 emits a random code with Tp=Tc. Activation Fd(t) of discrimination cell 3 is determined by the similarity of the total input Li(t) of input cells 1 and total input Lm(t) of memory cells 2. Timing td(t) of discrimination cell 3 is adjusted so that said cell absorbs the maximum amount of energy during time when its random code Dd(t) is non-zero that is, cell 3 extremizes the absorbed energy. If the total input in memory cell 2 exceeds a certain value said memory cell adjust its timing tm(t) to be equal to the timing ti(t) of the other members of pairs 4.

Figure 4:
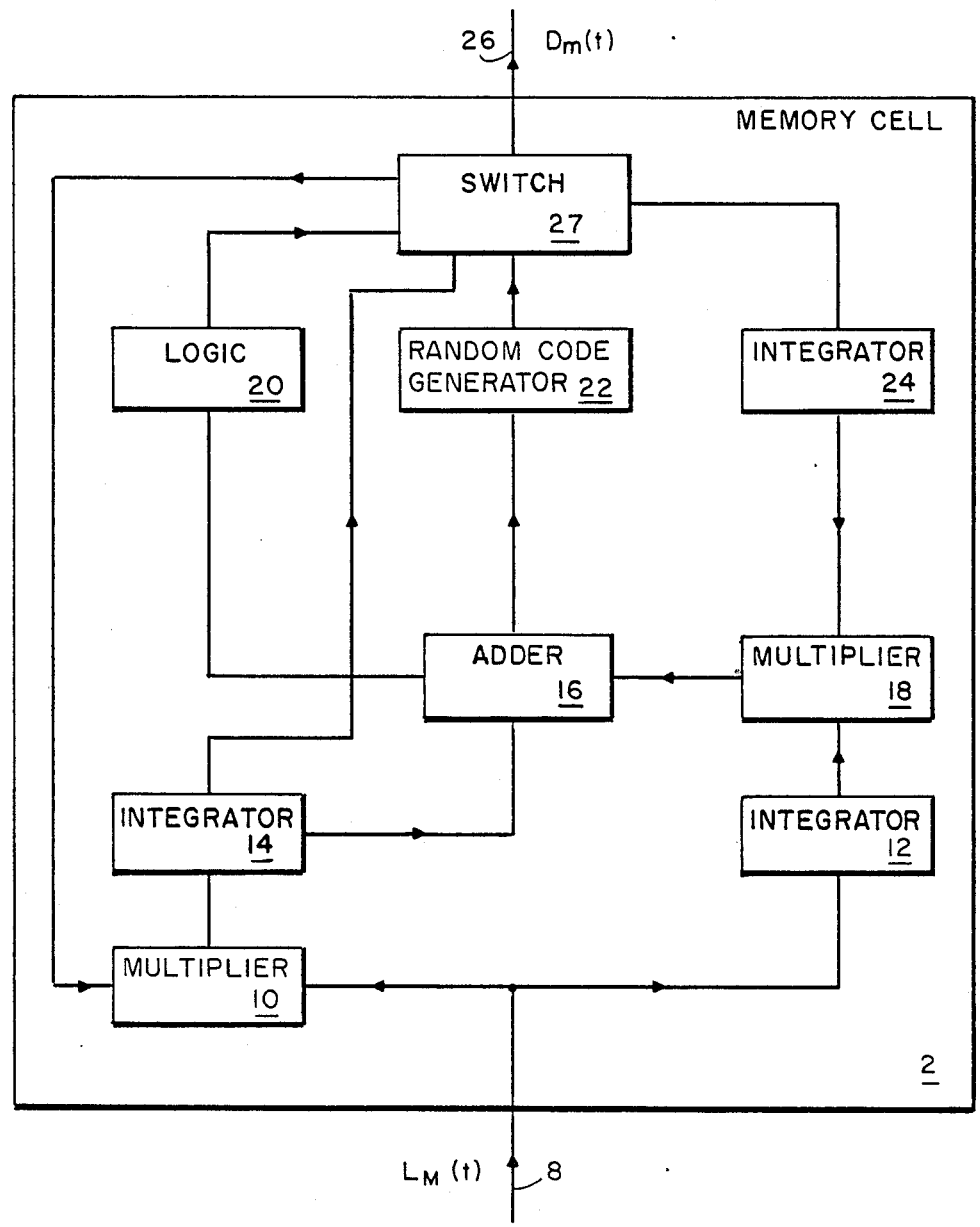
FIG. 4 is a block-diagram of a memory cell.

Referring now to FIG. 4 a block-diagram of a memory cell is shown. The input 8 of memory cell 2 is $$Lm(t) = SUMq[Tmq \, Dq(t)]$$

where the sum over q includes the sum over input cell 2 of corresponding pair 4 and discrimination cell 3. Input 8 is integrated in integrator 12 to obtain $<Lm(t)>$, the average of Lm(t) over a time period T' which is an integer multiple of the code length Tc. Input 8 is multiplied in the multiplier 10 by the output 26 of memory cell 2 to produce as its output a piece-wise constant function (Lm(t) Dm(t)). Said function is averaged by the integrator 14 to obtain function $<Lm(t) \, Dm(t)>$ which is an average over time period T'. Outputs $<Dm(t)>$ of integrator 24 and $<Lm(t)>$ of integrator 12 are multiplied in multiplier 18. The output of adder 16 is dependent on inputs of integrator 14 and multiplier 18. In this particular embodiment of the present invention the output of adder 16 is proportional to the difference Cm(t) of the inputs from integrator 14 and multiplier 18, which results in output Cm(t) depending piece-wise linearly on the timings tm(t). In other embodiments said dependence is quadratic polynomial.

The output Cm(t) of adder 16 serves as input in logical circuit 20 and random code generator 22. Logical circuit 20 as an output has the timing biasing function Bm(t), which is the input in the switch 27. Within a time span of code length Tc switch 27 is closed during time from (n Tc) to (n Tc+tm(t)+(s/fo)) and in the time interval from (n Tc+Tp+tm(t)+(s/fo)) to ((n+1) Tc), where n is any odd number, s is a constant integer, and fo is the base frequency. When n is any even number, within a time span of code length Tc switch 27 is closed during time from (n Tc) to (n Tc+tm(t)) and in the time interval from (n Tc+Tp+tm(t)) to ((n+1) Tc). The effect of difference in timing for odd and even numbers n is that the timing tm(t) effectively oscillates between tm(t) and tm(t)+(s/fo) with uniform frequency 1/Tc. If Bm(t)>0 than the timing tm(t) is increased in the switch 27 by one unit. If Bm(t)<0 said timing is decreased by one unit. If Bm(t)=0 there is no change in said timing. Timing biasing function Bm(t) is multiplied in the switch 27 by a memory biasing function $$B'(t) = \max(0, <Lm(t)Dm(t)> - r'),$$

where r' is some constant. Said memory biasing function is obtained by thresholding the output of integrator 14. As a result, timing tm(t) can only change if the average partial energy $<Lm(t) \, Dm(t)>$ absorbed by memory cell 2 exceeds a certain value r'. Therefore learning will occur only if there is a close enough match between Lm(t) and Li(t).

Output Cm(t) of adder 16 controls the total number of pulses within pulse length Tc. Positive Cm(t) increase the total number of pulses in the output random code 26, negative Cm decrease said number of pulses. The output Dm(t) of switch 27 is proportional to a random binary sequence of zeros and ones such that the sequence is all zeros in the time interval from (n Tc) to (n Tc+tm(t)) and in the time interval from (n Tc+Tp+tm(t)) to ((n+1) Tc), where n is any integer even number. Timing tm(t) is shifted by s units when n is an odd integer.

Figure 5:
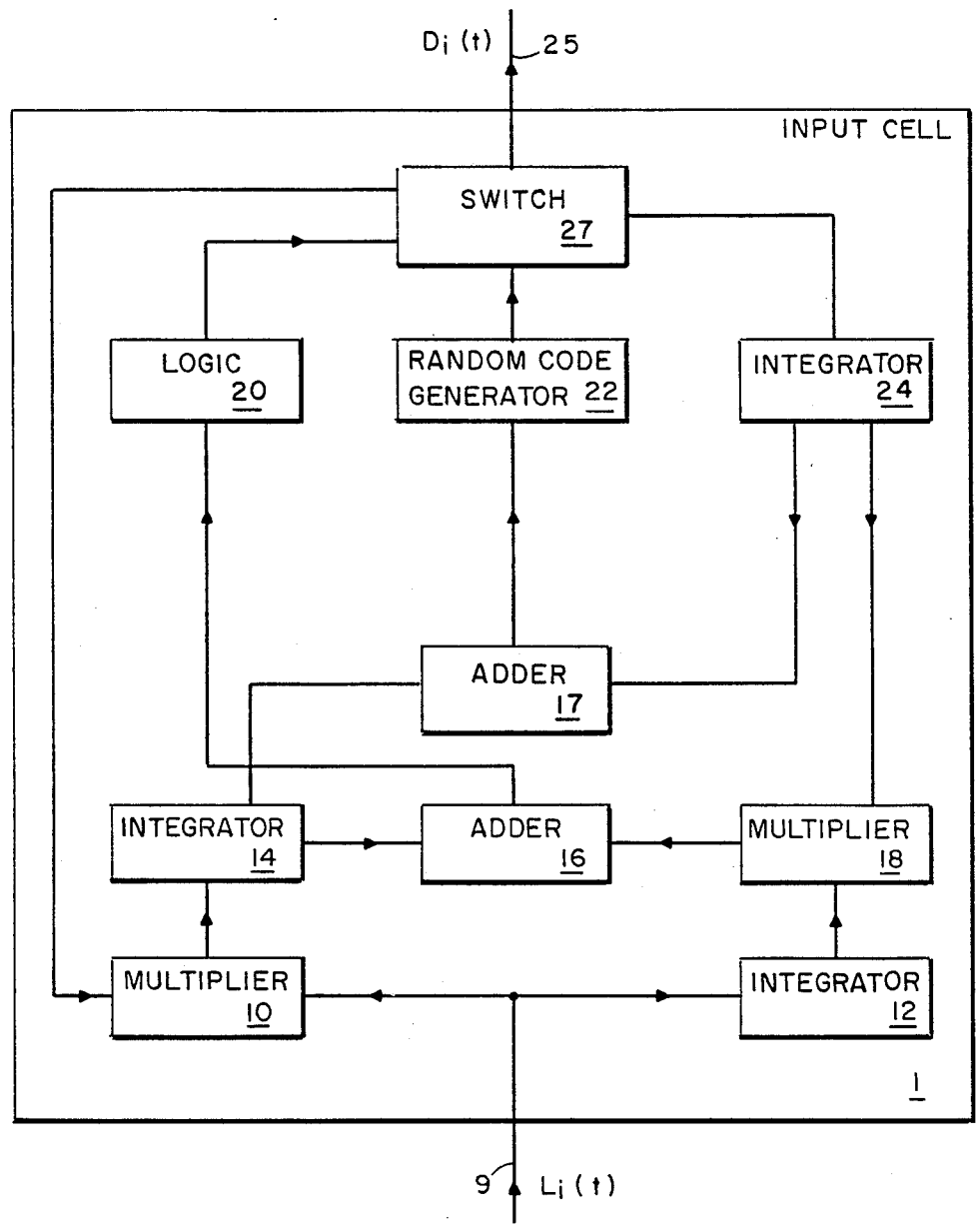
FIG. 5 is a block-diagram of an input cell.

Referring now to FIG. 5 a block-diagram of an input cell is shown. Input 9 of input cell 1 undergoes processing in multipliers 10, 18, integrators 12, 14, 24, switch 27, and random code generator 22 in the same way as in memory cell 2. Outputs of integrators 14, 24, and multiplier 18 are combined together in adder 17 to produce an output Gi(t) which controls the random code generator 22 in the form of bias for increase or decrease of the total number of pulses within the pulse length Tp. Outputs of integrator 14 and multiplier 18 are combined in adder 16 to produce output which controls the logical circuit 20. In this particular embodiment of the present invention said output of adder 16 is $$Ci(t) = <Li(t)Di(t)> - <Li(t)><Di(t)>,$$

which is linear in timing ti(t). In other embodiments said output is a quadratic polynomial in tp. The output of logical circuit 20 controls input cell 1 timing ti(t). The output Di(t) of switch 27 is proportional to a random binary sequence of zeros and ones such that the sequence is all zeros in the time interval from (n Tc) to (n Tc+ti(t)) and in the time interval from (n Tc+Tp+ti(t)) to ((n+1) Tc), where n is any even integer number. Timing ti(t) is shifted by s units for n an odd integer. Said output Di(t) controls integrator 24 and multiplier 10, and is the output of the input cell 1.

Figure 6:
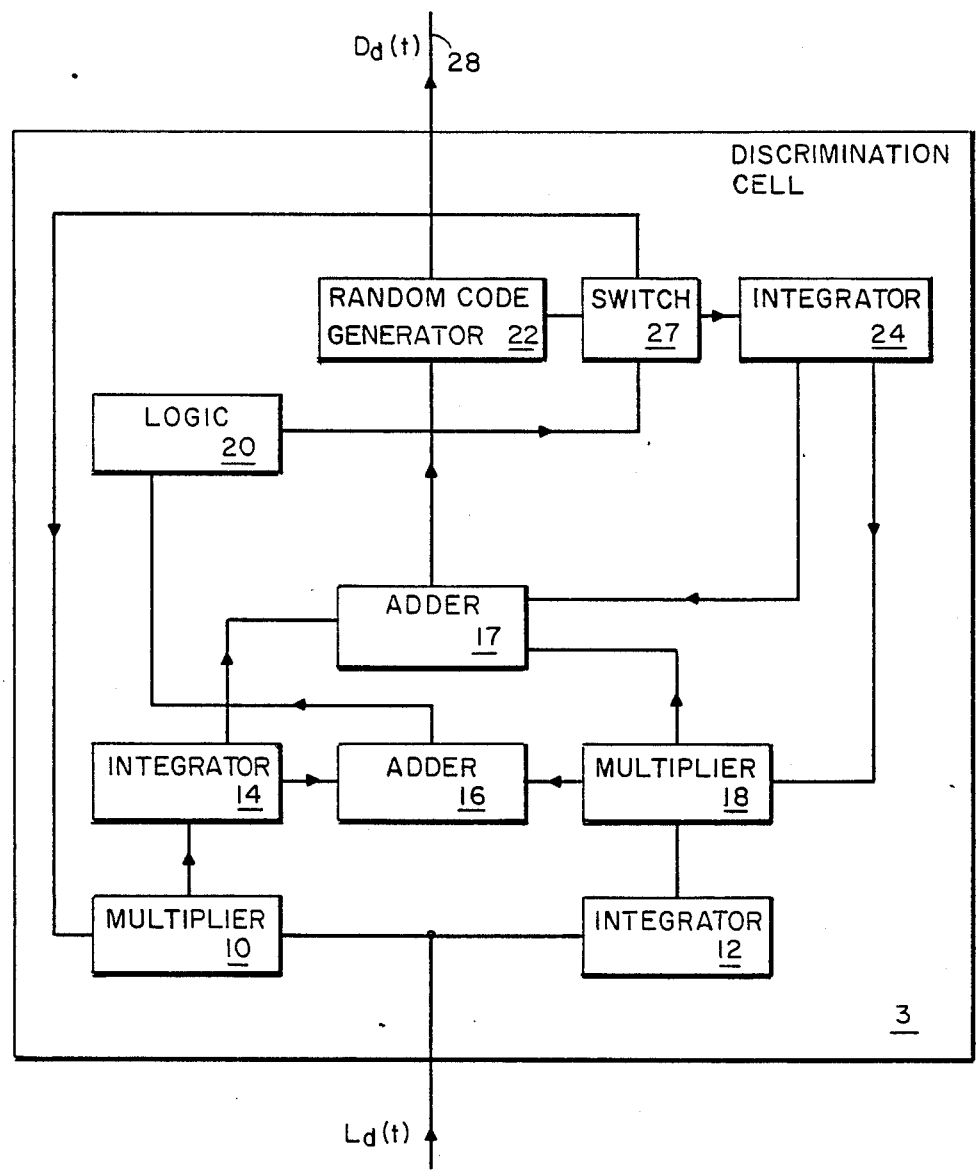
FIG. 6 is a block-diagram of a discrimination cell.

Referring now to FIG. 6 a block diagram of discrimination cell 3 is shown. Functions of multipliers 10,18; integrators 24,12; logical circuit 20, and adders 16, 17 are similar to those for an input cell 1 where the discrimination cell input is Ld(t). The output of the discrimination cell 3 is proportional to a random sequence of zeros and ones which can be non-zero within the entire code length Tc. Discrimination cell timing td(t) is determined by the logical circuit 20, switch 27, and the total discrimination cell input Ld(t) with the use of the internal code D'd(t), which can be non zero only within a window of length Tp within the code length Tc, similar to the output codes of memory and input cells.

Figure 7:
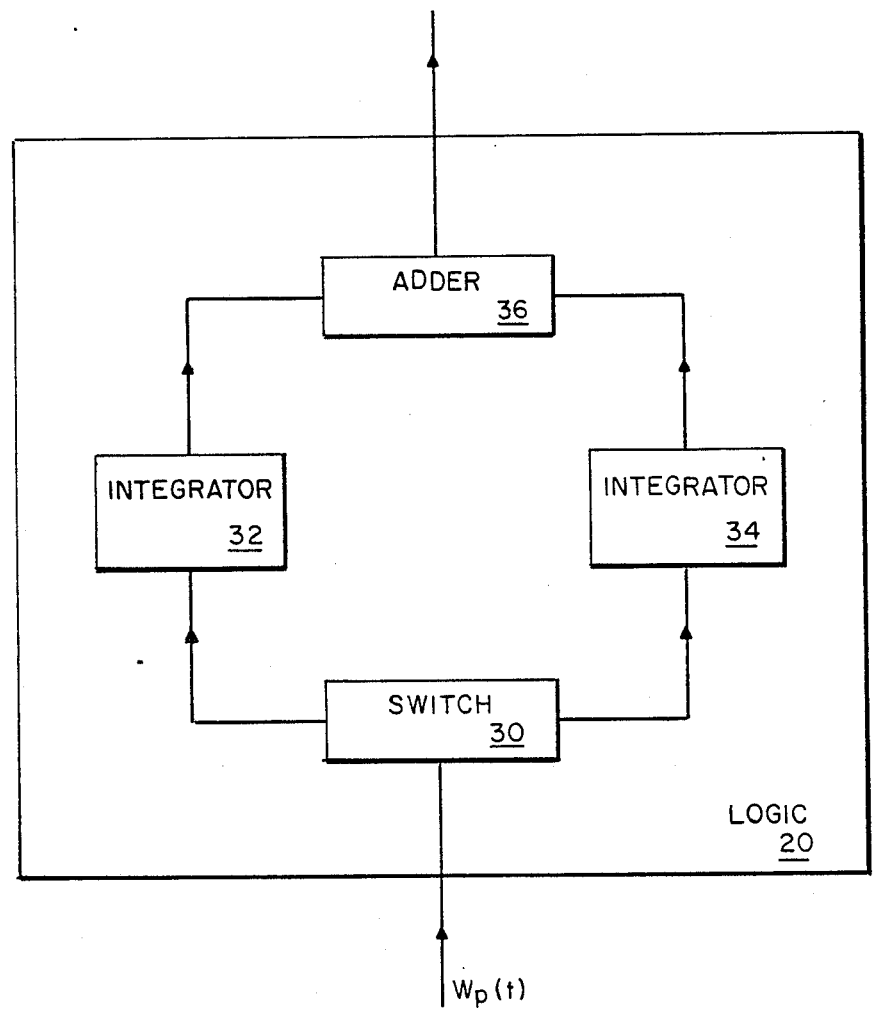
FIG. 7 is a block-diagram of logical circuit 20 of FIGS. 4, 5.

Referring now to FIG. 7 a block diagram of logical circuit 20 is shown. In this particular embodiment of the present invention the input into the logical circuit 20 is given by the correlation function Cp(t). Switch 30 directs the input Cp(t) to the integrator 32 during time from (n Tc) to (n+1) Tc for n odd and to the integrator 34 when said number n is even. Integrators 32, 34 average their inputs over a time scale T''=m Tc, where m is some integer number. Outputs of integrators 32, 34 are subtracted in the adder 36. The output of adder 36 is the timing biasing function B(t). The net effect of the operation of the logical circuit 20 is approximate computation of the derivative of the correlation functions Ci(t), Cm(t), or Cd(t) with respect to shift in timing tp(t). This results in adjustment by switch 27 of the corresponding timings in such a way that said functions are extremized by the steepest ascent method in said timings $$tp'(t') - tp(t) = (1/fo) \, \text{sign} \, (Cp(t'p(t)) - Cp(tp(t))).$$

Unlike the error functionals used in the back propagation of error technique, functionals Cp(t) depend only on few variables. As a result, extremization of functionals Cp(t) can be performed locally, by each RCNN processor adjusting its own timing tp(t) by obtaining information only from its nearest neighbors.

Figure 8:
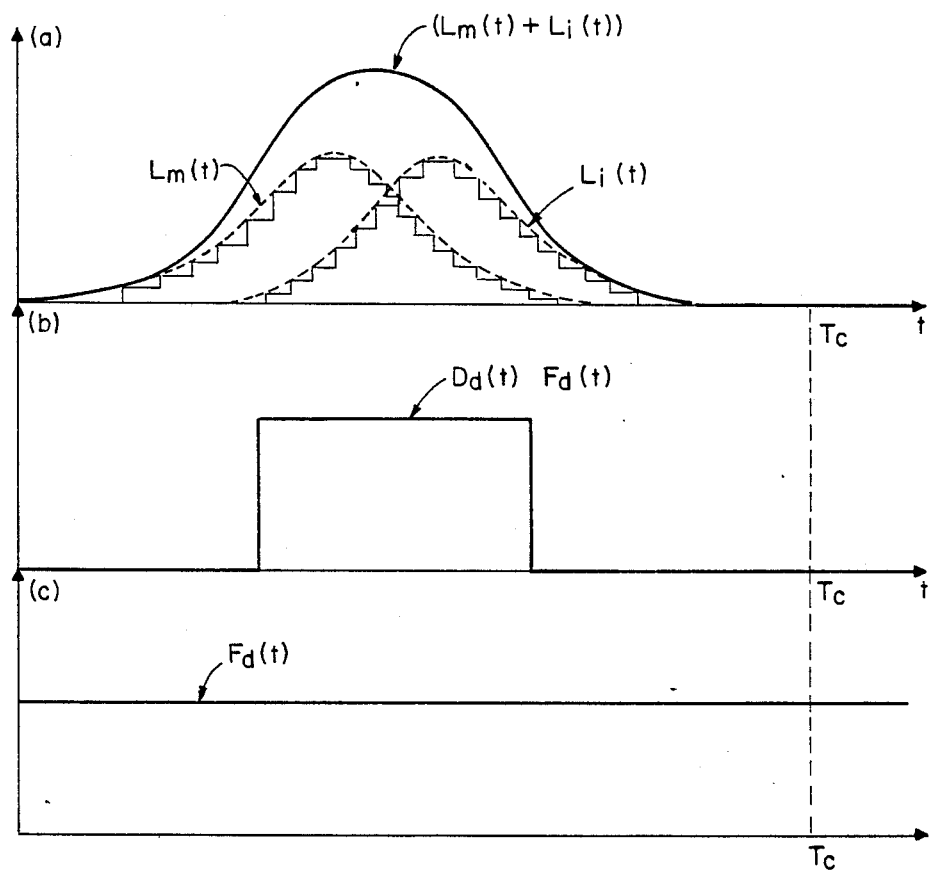
FIG. 8 illustrates input and output of the discrimination cell when sufficient matching between input and memory occurs.

Referring now to FIG. 8 operation of the discrimination cell 3 is shown when there is a good match between input Lm(t) from memory cells 2 and input Li(t) from input cells 1. Graph (a) exhibits the average sum of said inputs. Extremization of functional Cd(t) results in the internal code D'd(t), which the output of switch 27 of discrimination cell 3, adjusting its timing in such a way that the maximum amount of average energy reaches the integrator 14 from the external input. As as a consequence the maximum of the function Lm(t)+Li(t) coincides in time with the middle of the non-zero section of code D'd(t) on graph (b) and the value of the activation Fd(t) on graph (c) of the discrimination cell 3 is relatively high.

Figure 9:
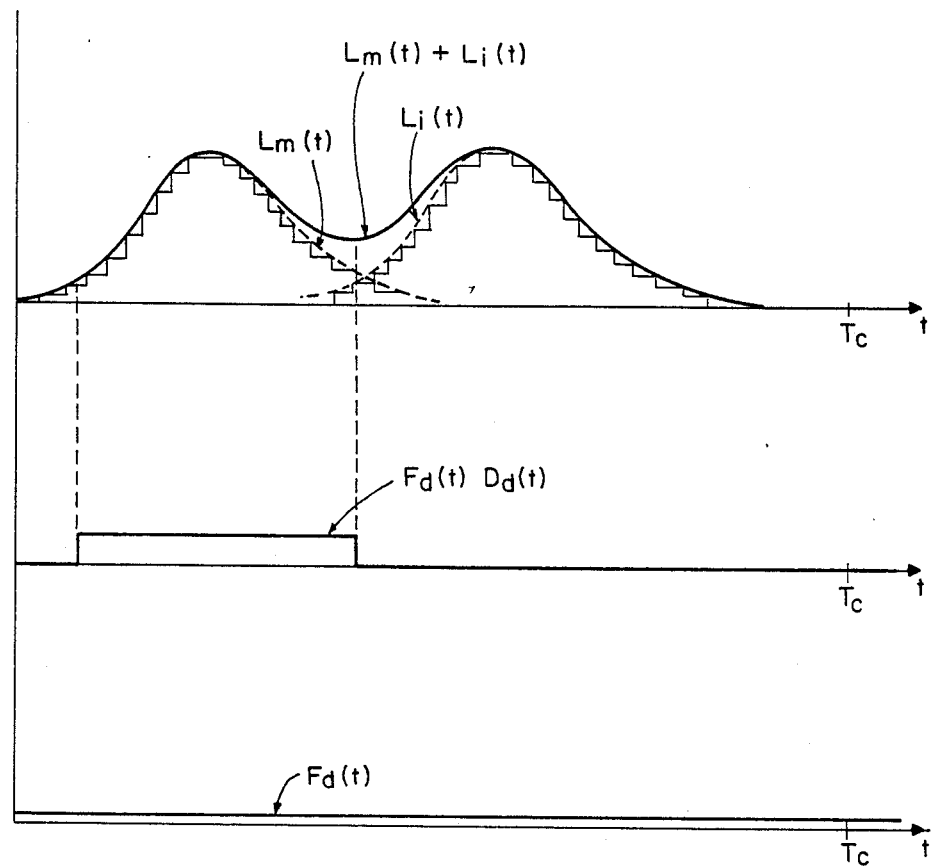
FIG. 9 illustrates input and output of discrimination cell when insufficient matching occurs.

Referring now to FIG. 9 a poor match between input and memory is exhibited. The sum of the inputs on graph (a) now has two maximums and as a result the middle of the internal code D'd(t) on graph (b) is aligned in time with one of the two maximums. Consequently, the activation Fd(t) of the discrimination cell is relatively low.

Figure 10:
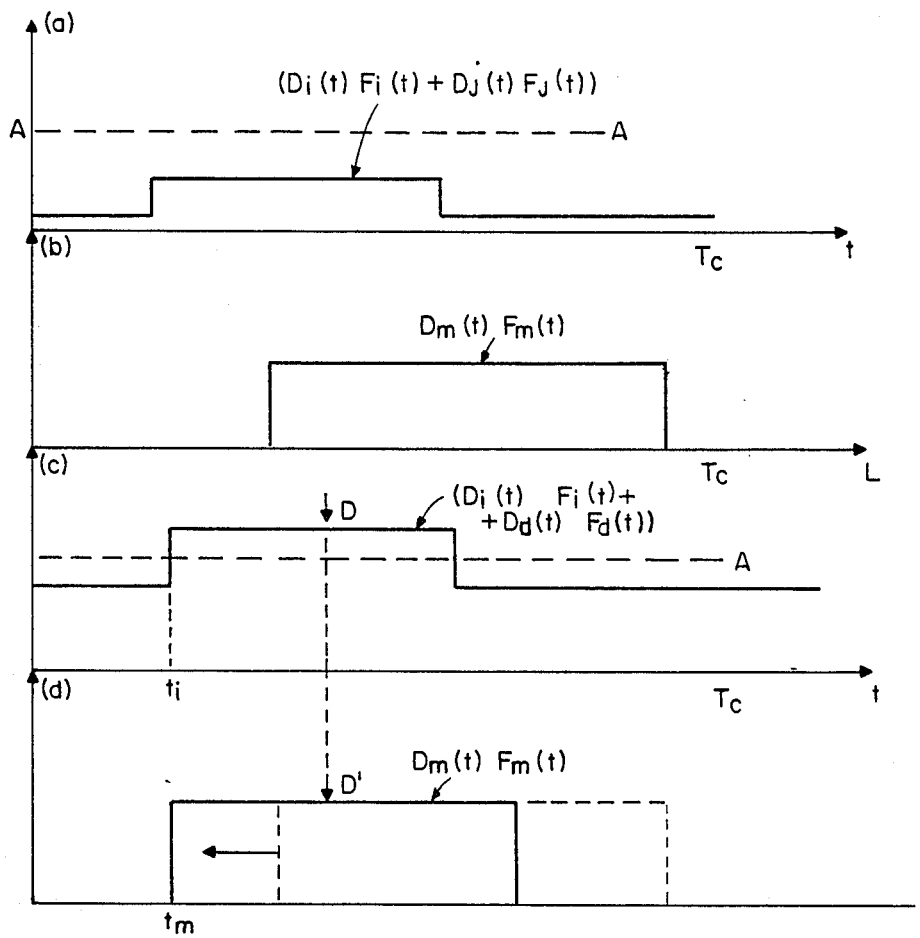
FIG. 10 illustrates adjustments of a memory cell timing when sufficient or insufficient matching occurs.

Referring now to FIG. 10 the effect of good and poor match of memory and input is shown. When the total input in the memory cell is low as in the case of poor match, the combined density of the pulses of the total input is represented on graph (a). The threshold for memory timing updating A—A is reached at no point. As a result the density of pulses on graph (b) is relatively low, the memory cell activation Fm(t) is relatively low, and the timing tm(t) of the memory cell is not updated. When the total input in the memory cell is high as when a good match occurs the total density of pulses exceeds threshold A—A and as a result the memory cell activation Fm(t) is relatively high and the memory timing tm(t) decreases in the direction of arrow C in such a way that center D of graph (d) is aligned with center D' of graph (c).

Each of the cells described above may be in the form of memory locations of a digital computer. The adders, integrators and multipliers would be digital, and the switches would be logical true/false operators. The random code generators would be pseudo-random number generators.

The invention claimed is:

1. A random code neural network with learning capability for discrimination of the difference between digitally encoded input and digitally encoded memory information comprising:

a plurality of input cells, a plurality of memory cells and a plurality of discrimination cells interconnected for communication therebetween to exchange signals in the form of random binary codes, each input cell, memory cell, and discrimination cell including means to emit said signals periodically within time spans of length Tp within larger time spans Tc and including means for learning external input by extremizing a local functional of the total input of said cell's binary code by adjustment of the position of the time span of duration Tp within the larger time span Tc.

2. A neural network as claimed in claim 1 wherein the means for learning extremizes a local functional which is a piece-wise linear function of the position of the time span.

3. A neural network as claimed in claim 1 wherein the means for learning extremizes a local functional which is a piece-wise quadratic polynomial in the position of the time span.

4. A method for using a random code neural network with learning capability for discrimination of the difference between digitally encoded input and digitally encoded memory information comprising:

arranging a plurality of input processors, memory processors and discrimination processors in a random code neural network to exchange information between the processors in the form of random binary codes periodically by emitting random binary codes within time spans of duration Tp within larger time spans of duration Tc; and in each of the memory processors and discrimination processors, extremizing a local functional of the total input to the processor and said processor's binary code by adjusting the position of the time span of duration Tp within the larger time span Tc to learn in the memory processor external input to the input processor.

5. A method as claimed in claim 4 wherein the functional in each processor is a piece-wise linear function of the position of the time span.

6. A method of claim 4 wherein the functional in each processor is a piece-wise quadratic polynomial in said position of the time span.

7. A method as claimed in claim 4 wherein the binary codes are emitted in the form of radiant energy.

8. A method as claimed in claim 4 wherein the binary codes are in the form of binary strings and the input processors, memory processors and discrimination processors are digital processors.

* * * * *